United States Patent [19] [11] 3,911,110
Smirnoff [45] Oct. 7, 1975

[54] INSECTICIDAL COMPOSITIONS
[75] Inventor: Wladimir A. Smirnoff, Ste. Foy, Canada
[73] Assignee: Canadian Patents and Development Limited, Ottawa, Canada
[22] Filed: Dec. 22, 1972
[21] Appl. No.: 317,535

[52] U.S. Cl. .................................... 424/93; 424/94
[51] Int. Cl.² ......................................... A01N 15/00
[58] Field of Search ................................ 424/93, 94

[56] References Cited
UNITED STATES PATENTS
3,515,641   6/1970   Whitaker .......................... 424/94 X OTHER PUBLICATIONS
Smirnoff, W. A., Canadian Entomologist 103(12): 1829–1831 Dec. (28) 1971, "Effect of Chitinase on the Action of Bacillus Thuringiensis."
Rogoff; M. H. et al., A. Rev. Microbiol. 23: 357–386 (1969), "Bacillus Thuringiensis: Microbiological Considerations."
Lecadet; M. M., Microbiol. Toxins 3: 437–471 (1970), "Bacillus Thuringiensis Toxins – The Proteinaceous Crystal."
Heimpel; A. M. et al., Bacteriol. Revs. 24: 266–288 (1960), "Bacterial Insecticides."

Primary Examiner—Shep K. Rose
Attorney, Agent, or Firm—Alan A. Thomson

[57] ABSTRACT
An insecticidal composition comprising an enteric microorganism which is pathogenic to insects, and the enzyme chitinase. The insecticidal effect is increased by the concurrent contact of the insect with the chitinase. A typical microorganism is *Bacillus thuringiensis*.

9 Claims, No Drawings

INSECTICIDAL COMPOSITIONS

This invention is directed to insecticidal compositions based on enteromicroorganisms (including viruses) which are pathogenic to insects. Increased infectivity and insecticidal effect are obtained by the presence of the enzyme chitinase.

Recently the use of selected microorganism (bacteria, fungi and virus) preparations, which are natural enemies of the insects, has been developed. These natural enemies of the insects usually are harmless to other forms of life, or at least are less harmful than many widely used chemical insecticides. Preparations containing species of the genus Bacillus and particularly *Bacillus thuringiensis*, are currently being sprayed on a wide scale, particularly for the control of several species of Lepidoptera which attack agricultural crops. In many cases the insecticidal action is slower and less widespread than would be desired.

Many of these microorganisms (including viruses) infect the alimentary canal of the insect and an important controlling step in the rate and extent of insect mortality has been found to be the penetration of the gut tissues into the haemolymph. If this penetration could be accelerated or facilitated the rate and extent of mortality might be expected to be significantly increased.

In accordance with this invention, it has now been found that the combination of or the concurrent use of the enzyme chitinase is able to increase the insecticidal effectiveness of these enteric microorganisms (including viruses). The enzyme is combined with or applied with the insecticidal microorganism preparation.

Chitinase is produced exocellularly by certain bacteria and fungi. Material can be obtained from various strains of Beauveria e.g., *B. bassiana* (Bals.) Vuill; Cordyceps; and Streptomyces inter alia and it can be easily purified. Enzymatic activity in preparations is known to reach 2300 nephelometric units (units according to C. Jeuniaux "Chitine et Chitinolyse" Masson, Paris, 1963 p. 27). In some of the tests discussed below a certified chitinase supplied by Nutritional Biochemicals Corp. U.S.A. was used. In the aerial spraying tests a semi-purified material obtained from chicken entrails was used (about 890–950 nephelometric units).

The amount of the chitinase needed is only a very small amount, usually less than about 1% by wt. of the composition. Even trace amounts have been found effective e.g., from about 3 to 10 mg or more per lb. or gal. of total composition. The amount will also depend on the purity or activity of the enzyme preparation. Lab. Tests (as in Ex. 1 below) will readily indicate an effective concentration.

The insecticidal microorganisms (including viruses) which may be used include a number of varieties of *Bacillus thuringiensis e.g., alesti, solto, endomycetis, dendrolimus, aizawai, finitimus, galleriae, morrisoni, sub toxicus* and its serotype from 1 to 7. Chitinase can be used to facilitate the action of other entomopathogenic microorganisms that act through the gutwall, particularly selected *B. cereus* varieties, *B. popilliae*, *B. moritai* and other enterobacteriae. It can also be used with various entomopathogenic virus preparations particularly those of nucleopolyhedrosis, cytoplasmic granulosis, and the non-included viruses and pox viruses of insects. The enzyme may also be used in conjunction with various species of entomopathogenic fungi or microsporidia.

A carrier or filler suitable for such insecticidal compositions is normally used. Liquid carriers or diluents as would be used for spray application include water, ethylene glycol, glycerol, higher molecular weight polyglycols, kerosene, various mineral oils, corn oil, whale oil and other organic liquids such as xylene, alcohols and ketones. The mixture can be in the form of an emulsion usually oil-in-water type using known emulsifying agents. Fillers or powders may be used to make a dry composition suitable for dusting application. Dry powders of the bacteria (consisting mainly of spores or final whole culture) or virus can be made by spray, vacuum or freeze-drying technique. Suitable powders include talc, kaolin, bentonite and other clays, calcium carbonate, zeolite, diatomaceous earth and alumina. In special cases baits or vegetable powders such as bran or cereals can be used.

The insecticidal composition can also be applied by the aerosol technique using fluorinated hydrocarbon gases or other inert gases under pressure as propellant.

Chemical insecticides could be used in conjunction with the microbial-enzyme system for an enhanced effect. Lesser amounts than normally required of the chemical insecticide would suffice. Insect attractants may also be concurrently applied. Of course these chemicals should not significantly reduce the activity of the bacteria or virus.

The enzyme can be combined in small amounts with the microorganism (including virus) composition, or applied separately to the foliage or other locus frequented or consumed by the insects to be controlled. Sticking agents can be used to increase retention of the insecticide on the foliage or locus.

The following Examples are illustrative:

EXAMPLE 1

The effect of various concentrations of the enzyme added to two commercial preparations of *B. thuringiensis* and aqueous suspensions of pure cultures of this bacillus obtained on nutrient agar, were studied on larvae of *Choristoneura fumiferana* reared on artificial medium prepared by the method of Grisdale (December 1963 "Rearing insects on artificial diet" Interium Res. Rept Insect Pathol. Res. Inst., Sault Ste. Marie, Ont. ). Larvae were inoculated orally by placing a drop of the various suspensions tested on the artificial diet. Commercial preparations of *B. thuringiensis:* "Thuricide", trademark (international Minerals and Chemicals Corporation, Libertyville, Illinois, U.S.), serotype 5, var. *Galleriae;* and "Dipel", (trademark) serotype 3, var. alesti, were used at a dosage of 2.8 billion international units. The experiment also included tests to determine the action of the Bacillus and chitinase separately.

Mixtures which gave significant results were then tested under temperatures similar to those encountered in the field at the time (June); treatment with *B. thuringiensis* was used for control operations. The chitinase concentration was 10 mg. per lb. The experiments were repeated under the following conditions: 12 hours at 22°C, alternating with 12 hours at 16°C and at a relative humidity of 80%. A second series of experiments with these concentrations were performed under constant temperature of 16°C and 90% relative humidity. Each series with its respective control was repeated twice with 5 larvae and once with 20 larvae. There was no larval mortality in control rearings at the specified temperatures.

It was found that the activity of *B. thuringiensis* was considerably increased when chitinase was added to the preparation; larval mortality provoked by commercial preparations of *B. thuringiensis* was advanced by from 4 to 6 or more days for the various temperatures.

Pure cultures of these bacilli (cultured on nutrient agar) did not provoke more than 50- 60% mortality, but in treatments using combined bacilli and chitinase all the larvae succumbed from infection. The rapidity with which the insects died and the high degree of mortality, even at low temperatures, indicate that the action of *b. thuringiensis* was directly increased by the presence of chitinase.

EXAMPLE 2

Applications of *Bacillus thuringiensis* by airplane or ground equipment have been used with little success in the control of *Choristoneura fumiferana* Clemens. The reason is that the septicemia enterotoxinosis, which provoke mortality of spruce budworm larvae, is influenced by age and physiological condition of larvae, and by environmental conditions, especially temperature.

Infectivity tests carried out with *B thuringiensis* var. *Galleriae* (Serotype 5- Thuricide HPC diluted 1/10) on larvae of *C. fumiferana* reared on artificial diet or on balsam fir (*Abies balsamea Mill*) foliage, revealed that the addition of 10 mg of chitinase to 500 g of Thuricide, increased the pathogenic action of the Bacillus and greatly increased efficiency at low temperatures, ranging between 16°- 18°C. Larval mortality in tests with chitinase occurred 5 to 6 days earlier than that resulting from the action of the Bacillus alone and rapidly reached 100%.

On the basis of these results an aerial spraying test was performed in a stand of *A. balsamea* severely infected by *C. fumiferana* with Thuricide HPC alone, and with chitinase added. This experiment revealed that treatment with Bacillus plus chitinase arrested feeding of larvae and caused a rapid and higher mortality than was the case with Thuricide alone. Also, more foliage was saved in the area treated with Thuricide plus chitinase than in areas untreated or treated with Thuricide alone.

EXAMPLE 3

Experimental sprayings with commercial preparations of *B. thuringiensis* alone, and with chitinase, were carried out in balsam fir stands severely infested by spruce budworm. Three 100-acre plots were established in these stands: Plot 1 was sprayed with Thuricide HPC plus chitinase, Plot 2 with Thuricide HPC alone, and Plot 3 served as control. Spraying was done by a Steerman aircraft equipped with micron-aire sprayers, which permitted an even and good coverage.

In Plot 1, 60.3% mortality occurred after 6 days, 78% mortality after 12 days, and 88% mortality after 30 days following spraying. Forty-five percent of the pupae sample collected and brought to the laboratory for emergence died in rearing, making an over-all mortality of 94%. In Plot 2 mortality reached 54% in 6 days, 72.4% in 10 days and 72.9% in 30 days after spraying. Over-all mortality reached 85.5%. In the control plot, no mortality occurred after 6 days, 42% mortality occurred after 10 days, 47% after 30 days, and the over-all mortality was 65%.

To determine the protection of foliage resulting from spraying with Thuricide, the 18 inch branch tips cut during the pupal check were examined in the laboratory. The results were: Plot 1: 24% of the buds were totally defoliated, 36% partially preserved, and 39 % completely preserved. Plot 2: Results were 64% totally defoliated, 31% partially preserved, and 4% completely preserved. Plot 3: 86% were totally defoliated, 12% partially preserved, and 1% completely preserved. It was also established that *B. thuringiensis* survived for 30 days on foliage.

EXAMPLE 4

An extensive field trial was made on 10,000 acres of budworm-infested fir stands. Aerial spraying was carried out using the following unit formula

| Thuricide HPC | 0.5 gal |
| Polyglycol liquid | 0.5 gal |
| Sticking agent | 0.16 oz. |
| Water | 1 gal |
| Chitinase | 10 mg. |

The chitinase used had an activity of about 950 nephelometric units.

The number of insects killed and the foliage saved were as good as that obtainable by the commercial application of chemical insecticides and better than obtainable from the application of Thuricide alone. This biological insecticide would have a minimal effect on the ecology.

I claim:

1. An insecticidal composition comprising: (a) an enteric microorganism which is pathogenic to insects, and (b) the enzyme chitinase.

2. The composition of claim 1 wherein the pathogenic microorganism is an entomopathogenic enterobacteriae.

3. The composition of claim 2 wherein the enterobacteriae is one of Bacillus thuringiensis, Bacillus cereus, Bacillus popilliae and Bacillus moritai.

4. The composition of claim 3 wherein the pathogenic bacteria is a Bacillus thuringiensis preparation.

5. The composition of claim 1 wherein the chitinase is present in an effective amount less than about .1% by wt.

6. The composition of claim 1 including a carrier or diluent.

7. The composition of claim 1 including a powdered filler.

8. A method of increasing the insecticidal effect of enteric microorganisms pathogenic to insects, comprising contacting insects with the microorganism concurrently with the enzyme chitinase.

9. The method of claim 8 wherein chitinase is combined with a Bacillus thuringiensis insecticide.

* * * * *